Jan. 1, 1929.                A. O. APPELBERG                1,697,040
ELECTRICALLY CONTROLLED APPARATUS
Filed Sept. 23, 1922
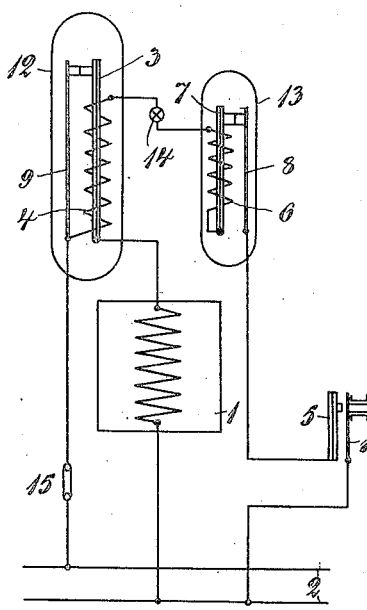
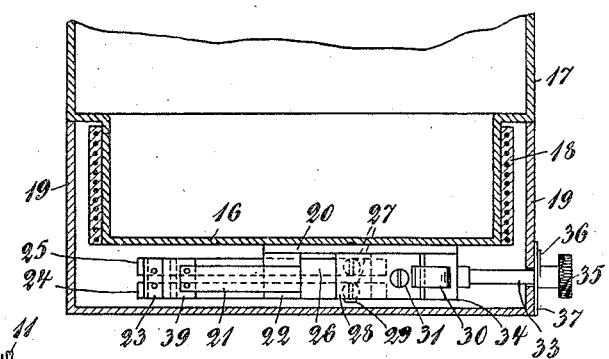
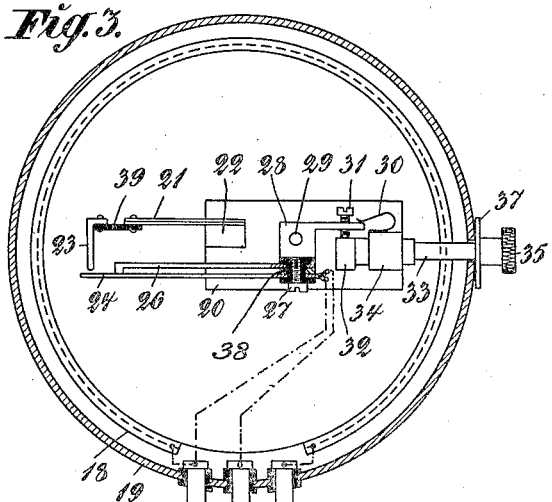
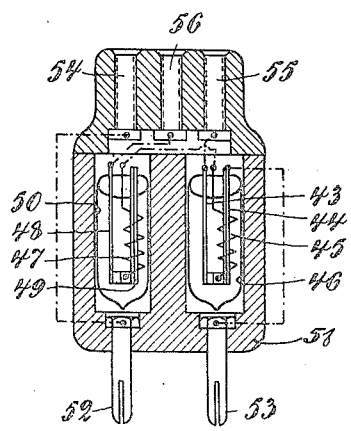
Inventor
A. O. Appelberg
By Marks & Clerk
Attys.

Patented Jan. 1, 1929.

1,697,040

UNITED STATES PATENT OFFICE.

AXEL OSVALD APPELBERG, OF STOCKHOLM, SWEDEN, ASSIGNOR TO AKTIEBOLAGET BIRKA REGULATOR, OF STOCKHOLM, SWEDEN.

ELECTRICALLY-CONTROLLED APPARATUS.

Application filed September 23, 1922, Serial No. 590,117, and in Sweden April 6, 1922.

The invention relates to electric control systems of the kind in which a thermostat is operated electrically by means of a heating resistance. The invention may be used for automatically controlling switches, rheostats, valves etc., for instance for regulating the supply of current to electric heating apparatus or the hot water supply of radiators or the like. The object of the invention is to obtain an automatic control of the operating circuit of the thermostat, so that the thermostat may be quickly brought in operation by a strong current and then kept in operated position by a small amount of energy so as to prevent overheating of the thermostat and loss of energy. To this end the operating circuit is controlled according to the invention by a slow-acting auxiliary switch arranged to be brought in action by the closure of the operating circuit and operating to reduce the supply of energy to the thermostat such operation, however, taking place only after the lapse of a certain period of time corresponding to that required for bringing the thermostat into operation, with the result that the thermostat, after having been operated, will be supplied only with so much energy as is required for maintaining it in operative position. Said auxiliary switch may also consist of a thermostat with a heating winding inserted either directly in the operating circuit or in a separate circuit.

Another object of the invention is to make the controlling set of apparatus wholly or partly as a separate unit adapted to be readily connected, when wanted, to the heating apparatus or other current consumption apparatus. Further, the invention has for its object to combine the controlling set of apparatus with the switching member, such as a wall plug or the like, whereby the heating or other apparatus is connected to the source of current, so that no particular manipulation may be required for connecting up the controlling set.

Particularly when applied to heat-producing apparatus such as cooking apparatus, the controlling set may be made in the form of a self-contained unit, which is entirely separated from the heating apparatus, and the thermic relay, whereby the thermostatic switch is operated, may then be connected to the wall plug by means of a flexible conductor, so that it may be mounted at any suitable place on the cooking apparatus, for instance in direct thermic relation with the substance to be heated, whereas the thermostatic switch and the auxiliary switch are provided in the casing of the wall plug.

The invention may be applied to many different kinds of electric current consumption apparatus, although it is particularly intended for electric heat-producing apparatus. It should be understood that the term "electric heat-producing apparatus" used in the specification and the claims is to be interpreted in its broadest sense as covering generally electric apparatus in which electric energy is converted into heat for any purpose of heating, for instance, electric cooking apparatus, radiators, flat-irons, soldering irons and the like.

The invention will be more closely described with reference to the accompanying drawings in which Fig. 1 illustrates an application of the invention to electric radiators. Fig. 2 shows the lower part of an electric cooking apparatus in cross section, provided with a thermo-relay adjustable for different temperatures. Fig. 3 shows the cooking apparatus as seen from below, the casing enclosing the heating resistance and the thermo-relay being removed. Fig. 4 shows a wall plug for connecting a cooking apparatus according to Figs. 1 and 2 to the supply main, said wall plug containing a thermostatic cut-off switch and a thermostatic control switch.

In Fig. 1 an electric radiator 1 is connected to the supply main 2 over a thermostatic switch 3, consisting of a bi-metallic strip the heating winding 4 of which is included in an operating circuit containing a thermo-relay 5 located at a suitable place in the room to be heated, and the heating winding 6 of a thermostatic control switch 7. The latter consists of a thermostatic stem, the outer end of which is normally in contact with a contact spring 8. The thermostatic stem 3 similarly makes contact with a contact spring 9. The thermo-relay 5 likewise consists of a bi-metallic strip adapted to make contact with a contact spring 10 at a certain temperature in the room, said contact spring being adjustable by means of a set screw 11 for the purpose of regulating the temperature of the room.

When the thermo-relay 5 closes the operating circuit, the heating winding 4 of the thermostat 3 will first be passed by a relatively strong current, whereby the thermostat is quickly heated so as to break the contact 3, 9 and disconnect the radiator 1. The thermostat 3 is then supplied with an intermittent current produced by a repeated breaking and closing of the auxiliary switch 7, which is constructed so as not to open the operating circuit, until the thermostat 3 has been supplied with the amount of energy required for breaking the main circuit. Owing to the breaking and closing of the operating circuit the thermostat 3 will now receive only the amount of energy required for maintaining it in operated position. The auxiliary switch will thus operate as a safety device against overheating of the thermostat 3 at the same time allowing the supply of a great amount of energy immediately upon the closure of the operating circuit so as to bring the thermostat quickly in operation. The same result may, of course, also be obtained, if the auxiliary switch 7 is arranged to interpose a resistance in the operating circuit without breaking the latter, thereby reducing the current to the strength sufficient for maintaining the thermostat 3 in operated position.

The heating winding of the auxiliary switch 7 need not necessarily be inserted in the operating circuit but may be provided in a separate circuit, which may be controlled by the thermostat 3 so as to be closed, when the latter is brought in operation.

In order to reduce the sparking upon interruption of the main circuit and to protect the breaking contacts the thermostat 3 may be placed in a receptacle 12 which is evacuated or filled with an inert gas, and preferably, the breaking contacts are made of refractory metals, such as tungsten, molybdenum or tantalum. Also the thermostat 7 is preferably arranged in an evacuated or gas-filled receptacle 13.

A lamp 14 included in the operating circuit serves to indicate when the temperature wanted is attained. By means of a switch 15 all apparatus may be entirely disconnected, if desired.

It will be seen that other regulating devices and apparatus, for instance admission valves for radiators, may be controlled exactly in the same manner. Instead of a bi-metallic body any other suitable expansible solid body, liquid or gas may, of course, be used, which is heated by electric current in the manner described to effect a mechanical movement. It is also evident that the operating circuit of the thermostat may be controlled otherwise than by a thermic relay, for instance purely mechanically.

Figs. 2–4 show the application of the invention to an electric cooking apparatus. In this case the thermo-relay is attached to the bottom 16 of the cooking vessel 17, which is provided with a heating resistance 18. The resistance 18 is enclosed together with the thermo-relay in a casing 19 surrounding the bottom of the cooking vessel. The different parts of the thermo-relay are mounted on a metal plate 20 arranged in contact with and preferably secured by soldering to the bottom 16, in order to obtain a good heat conducting connection. The relay consists of a bi-metallic strip 21 soldered at one end to a stud 22 on the plate 20 and provided at the other end with a contact piece 23 electrically insulated from the strip and adapted to make contact with two contact springs 24, 25 bearing against an abutment 26. The abutment 26 and the contact springs 24, 25 are fastened by means of screws 27 to a lever 28 pivoted on a pin 29. One arm of said lever is actuated by a spring 30, whereby the lever is pressed against an eccentric 32 through the medium of a set screw 31. Said eccentric is secured to one end of a spindle 33, the other end of which projects through the casing 19, and which spindle is rotatably mounted on a stud 34 of the plate 20. Provided on the outer end of the spindle 33 is a head 35 provided with a pointer 36 which may be set on an empirically graduated scale 37 giving the different temperatures at which a regulation of the current supply is to take place. By turning the eccentric 32 the lever 28 may be displaced angularly to set the contact springs 24, 25 at different distances from the contact piece 23 corresponding to the different positions in which the contact piece 23 makes contact with the springs 24, 25 for the different temperatures indicated on the scale. As seen from the drawing, the electric contacts are insulated by the insulation 38 about the screw 27 and the insulating piece 39 on the thermostatic strip from the latter as well as from the cooking vessel.

The heating resistance 18 is connected in usual way to contact pins 40, 41 on the cooking vessel. Between these contact pins there is provided a third contact pin 42 for connecting the thermo-relay, one contact strip of which is connected to said contact pin 42, whereas the other strip is connected to the contact pin 40.

The thermostatic switch comprises two contact stems 43, 44 the latter 44 of which consists of a bi-metallic strip provided with a heating winding 45. The switch is located in a glass tube 46 which is evacuated or filled with an inert gas for the purpose of reducing the sparking at the breaking contact and protecting the contacts against oxidizing. The winding 45 is connected at one end with the thermostatic strip 44 and at the other end with the heating winding 47 of a thermostatic auxiliary switch consisting of two contact stems 48, 49, the latter 49 of which consists of a bi-metallic strip, and which are likewise enclosed in an evacuated or gas-filled tube 50. The two tubes 46, 50 are provided in the casing of a wall plug 51 provided with contact pins 52, 53 for the connection of the plug to a wall socket or the like. Opposite to the contact pins 52, 53 there are provided three contact bushes 54, 55, and 56 corresponding to the contact pins 40, 41, and 42 on the cooking apparatus. The contact bush 54 is directly connected to the contact pin 52, whereas the connection between the bush 55 and the pin 53 includes the switch 43, 44. The contact bush 56 is connected to the contact strip 48 of the auxiliary switch, which is normally connected over the breaking contact of the auxiliary switch to the winding 47 connected to the thermostatic switch 49.

The cooking apparatus can be connected to the supply main by inserting the wall plug 51 in the wall socket and connecting the contact pins 40, 41, and 42 with the bushes 54, 55, and 56 by a plug-cord. The contact bushes 54, 55, and 56 may be dispensed with if said cord is directly connected with the wall plug 51 and provided with connecting contacts only at one end. Contingently the wall plug 51 may, of course, be put directly on the contact pins 40, 41, 42 of the cooking apparatus, in which case the connection to the supply main is effected by means of a cord connected to the contact pins 52, 53.

It is seen from the drawing that the windings 45 and 47 will be connected in series with each other and with the breaking contact of the auxiliary switch between the contact pins 52, 53, when the contact piece 23 of the thermo-relay makes contact with the contact springs 24, 25. The heating circuit of the cooking apparatus having been interrupted, the auxiliary switch will alternately break and close its contact 48, 49, so that the winding 45 will then be supplied only with the amount of energy required for keeping the main contact 43, 44 open. This will be going on as long as the contact piece 23 of the thermo-relay is still in contact with the contact springs 24, 25. However, as soon as the cooking apparatus has been somewhat cooled owing to the interruption of the current, the contact 23, 24, 25 is again opened, and the main switch will then again close the contact 43, 44 thereby switching the heating resistance 18 of the cooking apparatus in circuit and causing the regulating operation described to be repeated.

By the above mentioned setting of the thermo-relay the regulating operation may be caused to set in at different temperatures of the cooking apparatus or its contents. Owing to the contacts 24, 25 being elastic the thermostatic stem 21 is prevented from being subjected to bending stresses, whereby the structure of the thermostat might be gradually changed so as to alter the adjustment of temperature. The two contact springs 24, 25 may be replaced by a single contact spring connected to the contact pin 42 the contact pin 23 being then connected to the contact pin 40.

The main switch and the auxiliary switch may be easily exchanged, when required, and for this purpose they may for instance be provided with outer terminals adapted to make contact with corresponding contact springs inside the wall plug. The controlling set may, if required, be provided with separate terminals for the thermo-relay, so that the latter may be connected and disconnected separately.

In the examples described the switching member containing the thermostatic switches has been shown as a wall plug, but it is apparent that these switches may be combined with the same advantage with a screw contact in a form of a lamp socket or with a wall socket.

Although the invention is chiefly contemplated for electrical heating apparatus it may be applied with the same advantage to other electrical apparatus for the purpose of regulating the operation of the apparatus under the control of some device directly or indirectly influenced by the said apparatus. If for instance the electrical apparatus consists of a motor driving a pump, the operating circuit of the thermostatic switch may be arranged under the control of a float or the like so as to open and close the motor circuit at different levels of the liquid which is being pumped. As readily understood, the invention may be used similarly for many different purposes of electric control.

I claim:

1. A thermostatic regulating device comprising a thermostat, an operating circuit including a heating resistance for said thermostat, a circuit closing device in said operating circuit, and a thermostatic switch arranged under the control of said circuit closing device and adapted, upon being operated, to reduce the amount of energy supplied to said heating resistance after the thermostat has been operated.

2. A thermostatic regulating device comprising a thermostat, an operating circuit including a heating resistance for said thermostat, a circuit closing device in said operating circuit, and a thermostatic switch having a heating resistance included in the operating circuit in series with the switch so as to cause the operating circuit to be opened and closed repeatedly after the thermostat has been operated.

3. A thermostatic regulating device comprising a thermostat, an operating circuit including a heating resistance for said thermostat, a circuit closing device in said operating circuit, and a thermostatic switch arranged under the control of said circuit closing device and having a heating resistance connected in series with the switch and said circuit closing device, said thermostatic switch being located in a sealed receptacle.

In testimony whereof I affix my signature.

AXEL OSVALD APPELBERG.